United States Patent [19]
Ridgill et al.

[11] Patent Number: 5,326,244
[45] Date of Patent: Jul. 5, 1994

[54] AXIALLY COMPACT COMPRESSION MOLD

[75] Inventors: Adrian V. Ridgill, Manning; Mark O. Steele, Sumter, both of S.C.

[73] Assignee: Federal-Mogul Corporation, Southfield, Mich.

[21] Appl. No.: 972,261

[22] Filed: Nov. 5, 1992

[51] Int. Cl.⁵ .............................................. B29C 43/00
[52] U.S. Cl. ................................. 425/127; 264/259; 264/276; 425/408; 425/450.1; 425/DIG. 47
[58] Field of Search ................ 264/259, 276; 425/111, 425/125, 127, 128, 129.1, 395, 408, 443, 450.1, 544, DIG. 47

[56] References Cited

U.S. PATENT DOCUMENTS

| | | |
|---|---|---|
| 3,392,226 | 7/1968 | McKinven, Jr. |
| 3,475,790 | 11/1969 | Bush et al. ............... 425/DIG. 47 |
| 3,773,454 | 11/1973 | Horve et al. ............. 425/DIG. 47 |
| 3,950,119 | 4/1976 | Reichenbach ................. 425/251 |
| 3,993,420 | 11/1976 | Haas et al. ................... 425/127 |
| 4,249,874 | 2/1991 | Reichenbach et al. ........ 425/127 |
| 4,555,376 | 11/1985 | Butler ........................... 264/266 |
| 4,580,962 | 4/1986 | Haas .............................. 425/111 |
| 4,824,357 | 4/1989 | Christiansen ................. 425/117 |

*Primary Examiner*—Charles S. Bushey
*Attorney, Agent, or Firm*—Lawrence J. Shurupoff

[57] ABSTRACT

A mold assembly for molding an elastomeric sealing element onto an annular seal case includes a spring-biased outer sleeve that exerts a clamping force on the seal case during the molding cycle. During the mold closing stroke the leading edge of the sleeve engages the seal case before an uncured elastomeric charge reaches the seal case. The sleeve therefore acts as a flow barrier to limit any outward escape of elastomer from the mold cavity during molding. By isolating the clamping and flow limiting outer sleeve from the hydrostatic molding forces, the spring force applied to the outer sleeve may be reduced and the axial height of the mold assembly may also be reduced.

12 Claims, 3 Drawing Sheets

FIG. 1

AXIALLY COMPACT COMPRESSION MOLD

BACKGROUND OF THE INVENTION

1. Field of the Invention

This invention relates to a mold assembly for molding an elastomeric sealing member to an annular seal case so as to form a shaft seal.

2. Description of Prior Developments

Prior mold cavities are often defined by a stationary mold member and two concentrically arranged movable mold members. The movable mold members are typically located above the stationary mold member for coordinated downward motions. The outer movable mold member is initially moved downwardly against the stationary mold member to establish the mold cavity contour and later prevent the movement of mold flash in an outward radial direction.

The inner movable mold member is subsequently moved downwardly to compress a charge of elastomeric molding material that is pre-positioned on an annular shelf provided by the stationary mold member. The molding material is thereby pumped or squeezed radially outwardly from the shelf into the mold cavity defined by the outer mold member.

These movable mold members are commonly driven toward the stationary mold member by means of heavy duty disk springs that act in a sequential fashion so that the outer movable mold member is in its final position before the inner movable mold member begins to exert a squeezing force on the charge of molding material. The heavy duty springs provide the required spring force to prevent the mold members from separating under the hydrostatic molding pressure. This high spring clamping force necessitates a significant spring stack height. Moreover, a large spring stack height is needed in order to provide the necessary axial travel and clearance between the sequentially movable mold members and the fixed mold members.

Some older presses still in use do not have the necessary axial clearance or axial closed height to be able to utilize the described mold member assemblies. That is, the axial extent of the mold members and spring stacks is greater than the closed height of these molds. Since many older presses operate with a fixed cam-driven stroke, modern mold assemblies having considerable axial length would interfere with press closure.

U.S. Pat. No. 3,950,119 is representative of the prior art insofar as it shows a stationary lower mold member and two concentrically arranged upper mold members. The outer upper mold member forms the upper surface contour of the mold cavity and the inner upper mold member acts as a pumping device to pump the elastomeric molding material radially outwardly into the mold cavity. Each of the upper mold members has a resilient drive connection with the upper press element in the form of multiple stacks of disk springs or Belleville washers.

U.S. Pat. No. 4,249,874 shows an arrangement that is generally similar to the arrangement depicted in U.S. Pat. No. 3,950,119, as regards the above-noted features. U.S. Pat. No. 4,824,357 shows a variation of the above-noted arrangement wherein a single upper mold member is cooperatively associated with two lower mold members. Each of the lower mold members is biased upwardly by means of a stack of spring disks.

U.S. Pat. No. 4,555,376 shows a molding assembly wherein an inner annular clamping member is biased downwardly by a spring system so as to hold a polytetrafluoroethylene disk in a fixed position on the lower mold member. Subsequently, an outer mold member is driven downwardly to engage a metal seal case, thereby closing the mold cavity. The downward motion of the outer mold member is continued so as to deform the metal case and reform the elastomeric molding material to the dimensions of the closed mold cavity.

The present invention is concerned with an axially compact mold member assembly wherein a single movable mold member is used to both compress and mold the elastomeric molding material. The single movable mold member has a rigid, non-resilient connection with the associated press such that the mold member assembly has a relatively short height in its closed position so that it can be used with older presses.

The mold member assembly of the present invention does not utilize multiple stacks of heavy duty springs disposed in an axially tandem relationship with movable mold cavity members, such as are used in relevant prior arrangements. The spring stack of the present invention is removed from contact with the movable mold cavity forming members and arranged radially outwardly therefrom. In this manner, the spring stack is axially coextensive with the movable mold members.

Since no spring stack is provided over or under the movable mold members, the axial height of the mold may be reduced by the amount equal to that which would have been required to accommodate the spring stack. A principal advantage of the invention is that the mold member assembly can be mounted in older presses having relatively short mold member clearance spaces between the upper and lower mold shoes.

SUMMARY OF THE INVENTION

The present invention involves a mold assembly for molding oil seals and similar devices. The mold assembly avoids the use of large stacks of heavy duty disk springs previously required to overcome the hydrostatic molding pressure which tended to separate the mold members. In a preferred form of the invention, a radially outer clamping sleeve is slidably supported on a single movable mold member so as to engage and clamp an annular metal insert or seal against the stationary mold member.

The metal insert is thereby clamped in a fixed position prior to closure of the mold cavity. A light duty spring assembly is located between an upper press element such as a press shoe and the clamping sleeve to provide the necessary clamping force to initially hold the metal insert in place. The annular clamping sleeve also subsequently acts as a flash barrier during the molding cycle but does not require the high clamping forces required of previous clamping sleeves which were exposed to the axially-directed hydrostatic pressures generated by the compressed elastomeric material during molding.

The mold design simplifies the mold cavity componentry and allows the use of shorter mold member closed heights by eliminating large stacks of heavy duty disk springs that are often used in prior mold arrangements to hold the movable mold members in a closed position. Because the clamping sleeve of the present invention is not exposed to the high hydrostatic pressure of the elastomeric material, heavy duty spring stacks are not required to provide the initial clamping force for holding the metal insert in place. This allows for a more axially compact mold design.

The present invention includes only two mold cavity forming members, i.e. a lower stationary mold member, and a single upper movable mold member. This mold member assembly thus differs from the three-piece molding assemblies shown in the above noted U.S. Pat. Nos. 3,950,119, 4,249,874 and 4,249,874. The single movable mold member slidably supports an annular radially outer sleeve that is urged downwardly by a relatively light duty spring assembly.

During the closing stroke of the movable mold member, the outer sleeve strikes the surface of an annular metal seal case pre-positioned on the stationary mold member. The annular outer sleeve acts as a clamping mechanism to hold the metal case in a fixed position and also acts as a flash barrier to prevent outward escape of the elastomeric molding material during the final stages of the closing stroke.

BRIEF DESCRIPTION OF THE DRAWINGS

In the drawings:

FIG. 2 is taken on line A—A in FIG. 1, but with the molded seal assembly removed from the molding apparatus.

DETAILED DESCRIPTION OF THE PREFERRED EMBODIMENTS

Figure 1:
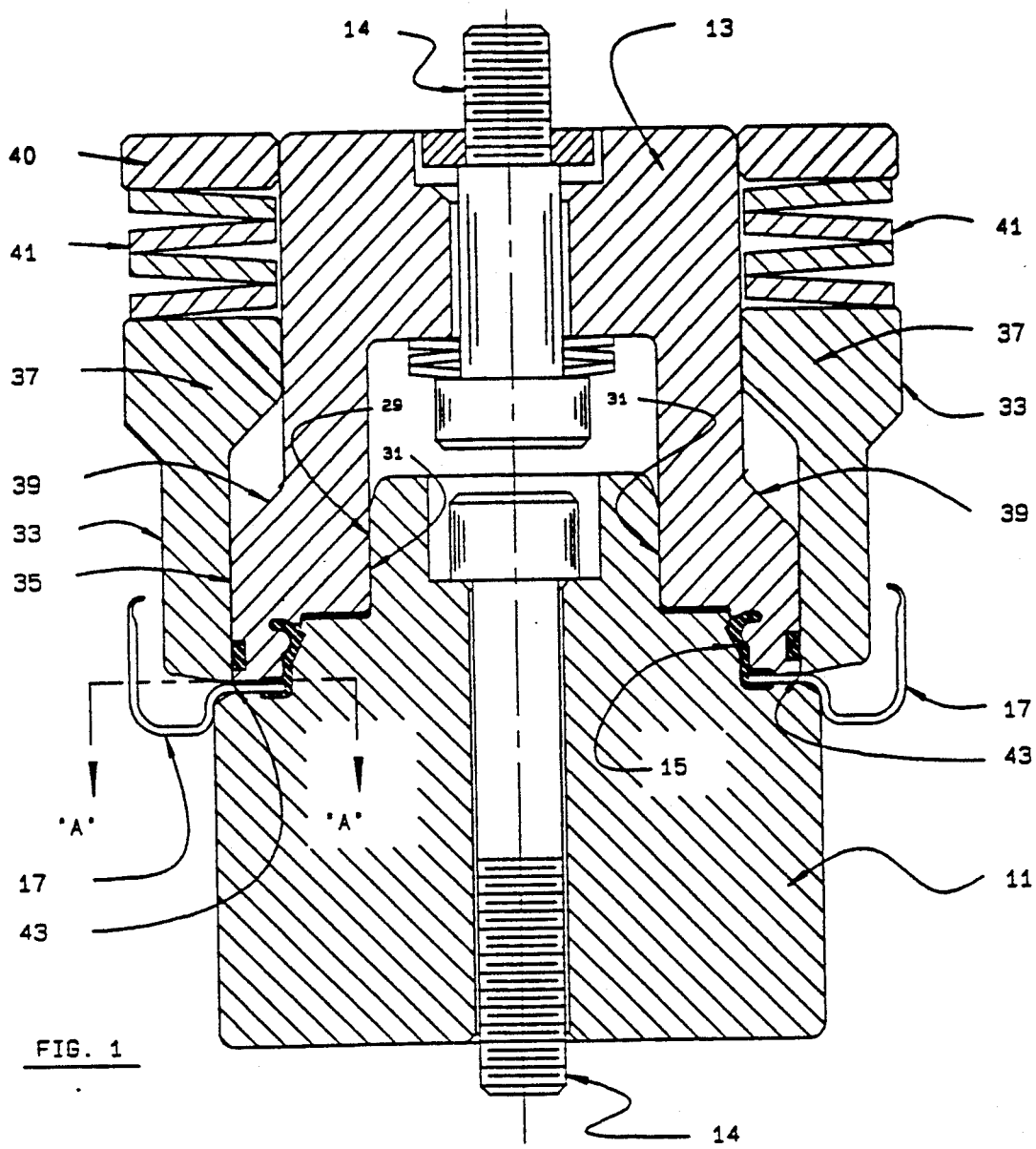
FIG. 1 is a sectional view through a mold assembly constructed according to the invention.

Referring to FIG. 1, there is shown a mold assembly which includes a lower stationary mold cavity member 11 and an upper movable mold cavity member 13. Member 13 is shown in its closed position wherein the mold members define a cavity for an elastomeric sealing member such as radial lip oil seal 15. Threaded fasteners 14 secure the upper and lower mold members to upper and lower press shoes provided on a mold press.

Figure 6:
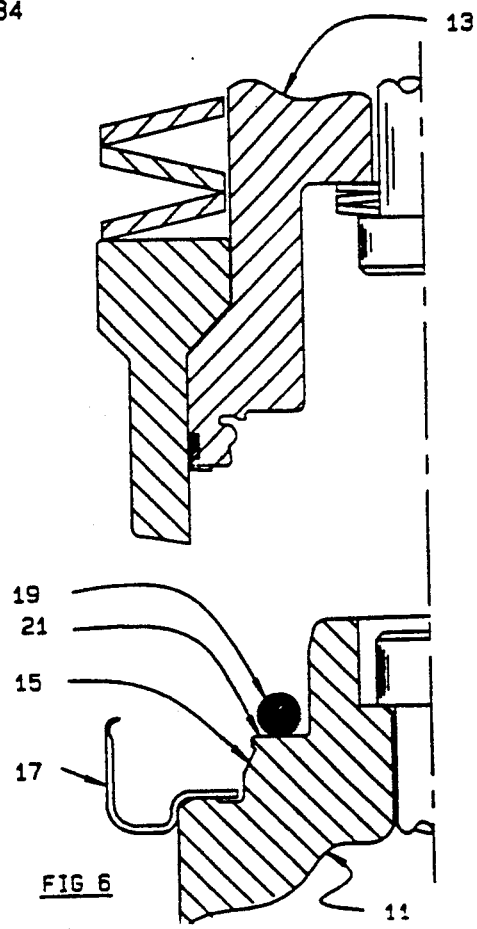
FIG. 6 is a view similar to FIGS. 3, 4 and 5 showing the mold assembly in its fully open position prior to initiation of a mold closing stroke.

An annular metal case insert 17 is shown attached to the molded elastomeric sealing member 15 incident to the molding process. In carrying out the molding process, the upper mold member 13 is first raised from the FIG. 1 position, after which the metal case 17 is placed on mold member 11. An annular charge of elastomeric molding material 19 is placed in the opened mold cavity as shown in FIG. 6. The mold cavity includes an annular shelf 21 formed on mold member 11 to receive the charge of elastomeric material 19.

Figure 4:
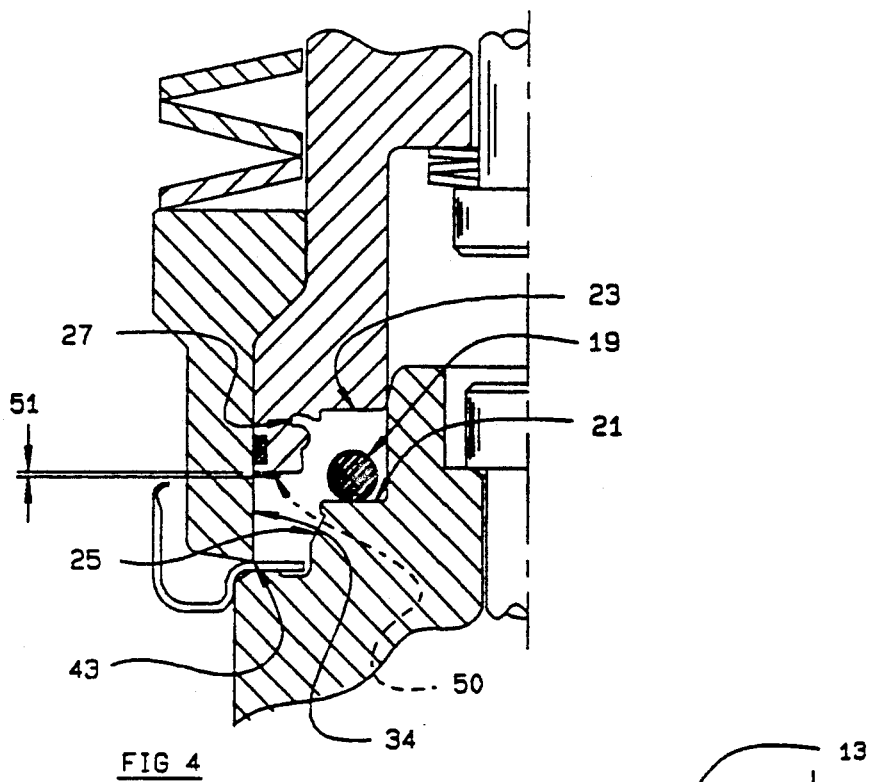
FIG. 4 is a fragmentary sectional view taken in the same direction as FIG. 1, but showing the movable mold member moving downwardly toward the stationary mold member to initiate a mold cavity closing stroke.
Figure 5:
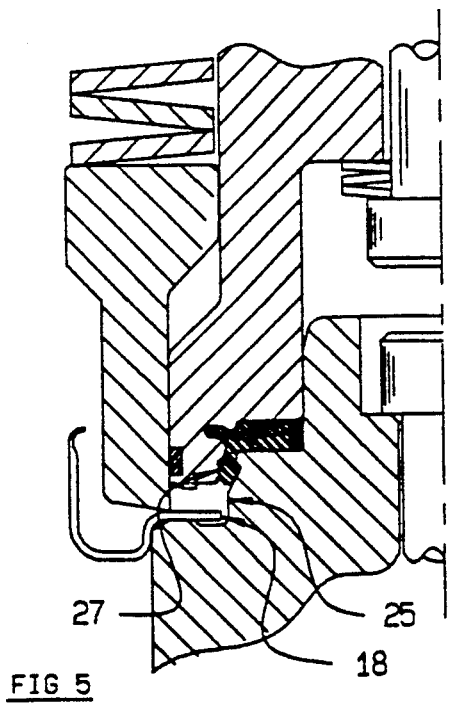
FIG. 5 is a fragmentary sectional view taken in the same direction as FIG. 4, but showing the upper mold member at a later stage in the closing stroke.

Mold member 13 includes a flat annular roof surface 23 in axial registry with shelf 21. Downward motion of mold member 13 causes roof surface 23 to exert a compressing force on the elastomeric material. FIG. 5 shows mold member 13 moved downwardly from the FIG. 4 position, such that the elastomeric material is forced to flow radially outwardly into the mold cavity space defined by the contoured mold cavity surfaces 25 and 27. Further downward motion of mold member 13 to the FIG. 1 position produces the molded assembly, i.e. the cured elastomeric seal 15 bonded to metal case 17.

Referring to FIG. 1, it will be seen that stationary mold member 11 includes a cylindrical pilot surface 29 slidably engaged with an internal annular slide surface 31 on the movable mold member 13. The close sliding fit between these surfaces prevents excess loss of molding material from the mold cavity while member 13 is moving downwardly on its mold closing stroke.

A principal feature of the invention is constituted by an annular sleeve 33 that is slidably supported on an exterior cylindrical side surface 35 of mold member 13. Sleeve 33 has an inwardly radiating annular flange 37 that is in axially engaging alignment with an annular exterior shoulder 39 on mold member 13. At or near its upper end, mold member 13 carries a spring seat 40 shown as an annular collar axially-piloted on the mold member. A relatively light spring assembly 41 is positioned between the upper end of sleeve 33 and the spring seat 40 such that sleeve 33 is biased downwardly toward the metal case 17 which is pre-positioned on the lower mold member 11.

Sleeve 33 is dimensioned so that, during the downstroke of mold member 13, the lower annular end edge 43 of the sleeve contacts metal case 17 prior to significant deformation and flow of the elastomeric charge 19. FIG. 4 shows the sleeve at the moment of initial impact between sleeve end edge 43 and case 17. Spring 41 maintains sleeve 33 in continued engagement with case 17 while mold member 13 continues its downward motion from the FIG. 4 position through the FIG. 5 position to the final closed position depicted in FIG. 1.

End edge 43 of sleeve 33 forms a flash barrier with case 17 for preventing the flow of elastomeric molding material radially outwardly from the mold cavity. The sleeve also acts as a clamping mechanism for holding case 17 in a fixed position while the elastomeric molding material is flowing around its radial inner edge 18 as referenced in FIG. 5.

It should be noted that the barrier function provided by sleeve 33 is separate from the molding function provided by member 13. As shown in FIG. 4, the flash barrier is established prior to the elastomer reforming action of mold member 13. Consequently, the contoured mold cavity surfaces 25 and 27 are in relatively unrestricted communication with shelf surface 21 and roof surface 23 while the elastomer is being pumped radially outwardly from shelf 21 into the space between cavity surfaces 25 and 27, as depicted in FIG. 5. This is advantageous in that the flowable elastomer does not have to negotiate extremely small passageways in order to completely fill the mold cavity. The final product thus has better assurance against having any voids or surface irregularities as might be caused by an incomplete filling of the mold cavity.

The unrestricted nature of the interconnecting passage system between the elastomer charge zone between surfaces 21 and 23 and the contoured mold surfaces 25 and 27 is believed to be relatively unique in this art. The differences in passage size and flow restriction stem from the fact that, in the prior art arrangements, the flow or flash barrier action is achieved by the outermost movable mold cavity member. That is, in prior designs the movable mold member that forms the flash barrier has to be essentially in the closed position prior to initiation of elastomer flow by the other movable mold member. With the mold member arrangement of the present invention, the flow barrier is established early in the downstroke of the movable mold member 13 such that substantial elastomer flow occurs before the movable mold member nears the end of the closing stroke, i.e. while the passage system is relatively unrestricted.

Contoured mold surfaces 25 and 27 can be varied depending on the desired surface contour of the final product. In the mold system shown in the drawings, the movable mold member 13 has an annular end surface 45 engageable with seal case 17 to limit the downstroke of mold member 13. Any elastomeric material that might otherwise be trapped between surface 45 and case 17 will be squeezed out of the case surface 45 interface and away from the barrier sleeve 33, i.e. in a rightward direction as seen in FIGS. 4 and 5.

In order to increase the bond contact surface area between case 17 and the elastomer, annular end surface 45 of mold member 13 may have a plurality of circumferentially spaced radial grooves formed therein. In FIG. 4, a representative groove is designated by numeral 50. The depth of each groove is denoted by numeral 51. Typically dimension 50 is only about 0.02 inch.

Figure 2:
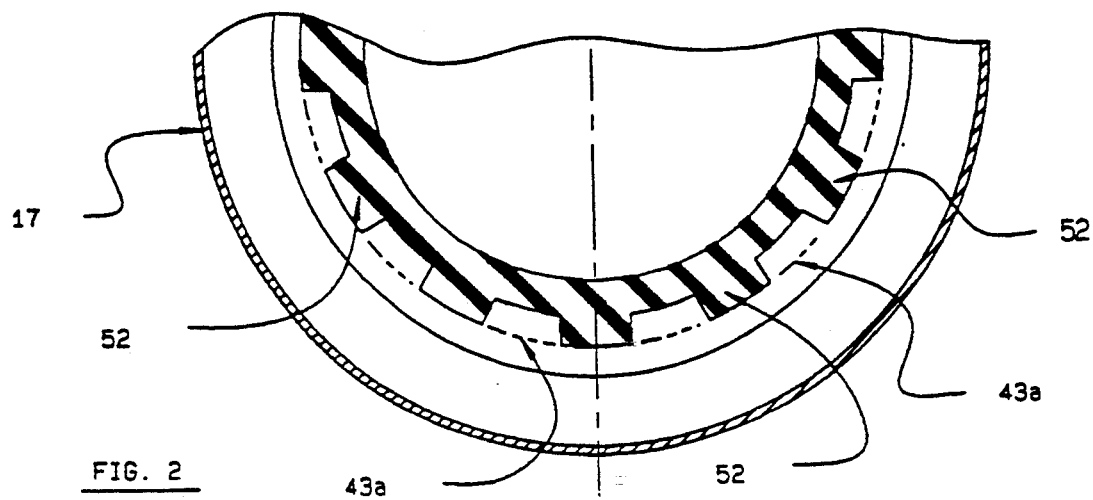
FIG. 2 is a fragmentary sectional view taken through a seal assembly formed by the FIG. 1 molding assembly.

During the final stages of the mold closing stroke, any elastomer located on annular end surface 45 will be forced into grooves 50 to form the radial fingers shown at 52 in FIG. 2. The outer edge of each finger 52 is defined by the inner surface of barrier sleeve 33. In FIG. 2, dashed line 43a indicates the position of the barrier sleeve end edge 43 relative to the elastomeric fingers 52. Elastomeric sections 52 augment the elastomer surface area bonded to metal case 17, thereby improving the overall structural integrity of the seal assembly.

As above noted, annular end surface 45 on mold member 13 limits the downstroke of mold member 13. Member 13 is driven by the associated press that provides the force for axially closing the mold cavity. Therefore, the mold cavity has the same volumetric dimension during each molding cycle. Dimensional variations from one part to the next part are thus minimal. Also, the size of the elastomeric charge 19 (FIG. 4) can be somewhat reduced because of the lesser scrap allocation.

The lower end surface of sleeve 33 is shown as acutely angled relative to the sleeve interior side surface 34 such that edge 43 has a knife edge character. Edge 43 thus has essentially line contact with metal case 17. The lessened contact area is advantageous because there is then a lessened possibility of the edge 43 allowing elastomer to leak across the barrier provided by sleeve surface 34. Should edge 43 become worn or gouged, the end surface of sleeve 33 can be easily machined to restore the knife edge configuration.

Figure 3:
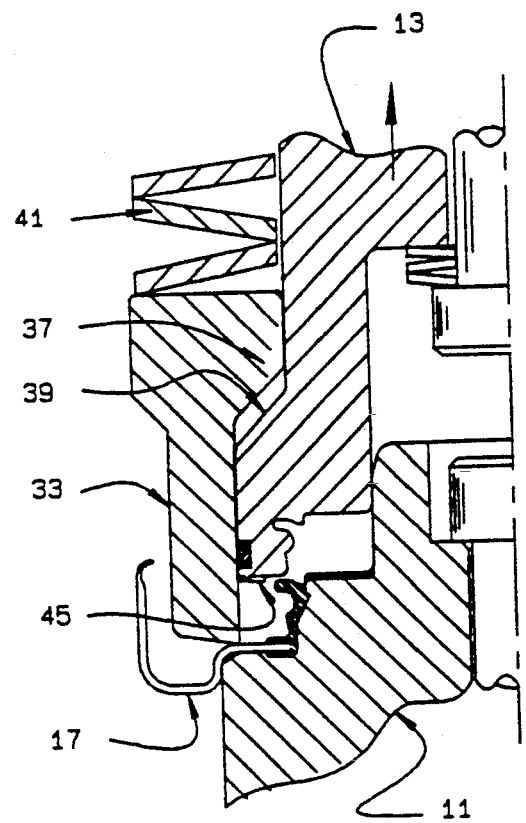
FIG. 3 is a fragmentary sectional view taken in the same direction as FIG. 1, but with the upper mold member raised from the lower mold member as, e.g., during the process of opening the mold cavity after a molding operation.

FIG. 3 illustrates an additional function of sleeve 33. As shown in FIG. 3, the mold member 13 is moving upwardly away from mold member 11 after completion of the elastomer curing cycle. While member 13 is moving away from member 11, the spring stack 41 holds sleeve 33 in clamped engagement with metal case 17 until shoulder 39 on mold member 13 engages flange 37 to lift the sleeve from the case. Sleeve 33 thereby acts as a stripper to ensure separation of the molded product from mold member 13.

It will be noted from FIG. 1 that spring stack 41 does not exert a downward axial force on mold member 13. Since sleeve 33 is not exposed to the pressurized elastomer during molding, spring stack 41 is used solely to provide the relatively light force needed to clamp sleeve 33 on case insert 17. The spring stack can have a relatively short length while still achieving the necessary force and stroke.

Spring stack 41 is offset laterally (radially) from mold member 13 so that the spring stack does not add to the overall height of the mold assembly formed by mold members 11 and 13. The mold assembly can therefore be accommodated in a relatively small axial space associated with pre-existing presses. Use of the illustrated mold member assembly can prolong the useful life of certain older presses that could not accept the mold member assemblies depicted in some of the previously referenced U.S. patents.

The drawings show specific structural features and relationships used in one particular embodiment of the invention. However, it will be appreciated that the invention can be practiced in various structural forms and arrangements.

What is claimed is:

1. A mold assembly for molding a sealing member to a seal case, said assembly comprising;

a first stationary mold member defining a first portion of said sealing member;

a second movable mold member defining a second portion of said sealing member;

said mold members cooperatively forming with said seal case a complete annular mold cavity when said second mold member is moved toward the first mold member and engages said seal case;

an annular clamping sleeve slidably supported on said second mold member;

resilient means engageable with said clamping sleeve for resiliently biasing said clamping sleeve against said seal case to retain said seal case in a fixed position on said first mold member;

said clamping sleeve being oriented so that during a closing stroke of the second mold member toward the first mold member the clamping sleeve engages the seal case before completion of the closing stroke, and during an opening stroke of the second mold member away from the first mold member the clamping sleeve remains in engagement with the seal case while the second mold member separates from the molded sealing member; and said clamping sleeve having an annular end portion engageable with the seal case and said molding material prior to completion of the closing stroke so that said annular end portion forms a flash barrier for preventing flow of molding material radially outwardly from the mold cavity.

2. The mold assembly of claim 1, wherein said first mold member comprises a cylindrical pilot surface, and said second mold member comprises an annular interior slide surface corresponding to the pilot surface so that during the closing stroke of the second mold member toward the first mold member said annular slide surface slides along the pilot surface to control escape of molding material from the radially innermost areas of the mold cavity.

3. The mold assembly of claim 2, wherein said second mold member has an annular end surface engageable with the seal case at completion of the closing stroke so that the mold cavity has the same volumetric displacement during each operating cycle of the mold assembly.

4. The mold assembly of claim 3, wherein said annular end surface of said second mold member has a plurality of radial grooves formed therein and adapted to accommodate molding material squeezed from an interface between the seal case and said annular end portion.

5. The mold assembly of claim 1, wherein said second mold member comprises an exterior cylindrical side surface; said annular clamping sleeve being slidably supported on said exterior side surface for slidable motion relative to said second mold member.

6. The mold assembly of claim 1, wherein said first mold member comprises an annular shelf adapted to receive thereon a charge of molding material and a contoured mold surface located radially outwardly from said shelf; said second mold member comprising a flat annular roof surface in axial registry with said shelf and a contoured mold surface located radially outwardly from said roof surface; said mold members being constructed so that during the closing stroke the annular roof surface exerts a compressing force on the molding material, whereby a substantial portion of the molding material is pumped into the annular space between the contoured mold surfaces before the second mold member reaches the end of the closing stroke.

7. A mold assembly for molding an annular sealing member to an annular seal case, said mold assembly comprising;

first and second mold members closeable together around said seal case to define a complete annular mold cavity, said first mold member having an outer annular surface adapted to support said seal case and an inner annular shelf surface adapted to support a charge of molding material, said second mold member having an outer annular end surface engageable with the seal case to complete a closing stroke required to form the mold cavity; and an annular clamping sleeve slidably supported on the second mold member so that during the closing stroke the clamping sleeve achieves clamping engagement with the seal case prior to completion of the closing stroke so that said clamping sleeve engages said molding material and acts as a flash barrier prior to completion of the closing stroke.

8. The mold assembly of claim 7, wherein said second mold member has an exterior cylindrical side surface extending axially from said annular end surface; said clamping sleeve being telescopically slidably supported on said exterior cylindrical side surface; said clamping sleeve having an annular end edge engageable with the seated seal case in close radial proximity to said annular end surface.

9. The mold assembly of claim 8, wherein said end edge of the clamping sleeve has line engagement with the seated seal case.

10. The mold assembly of claim 8, wherein said clamping sleeve has an inwardly radiating annular flange, and said second mold member has an outwardly radiating annular shoulder aligned with said flange; said flange and shoulder being axially spaced when the second mold member is in a closed position such that said clamping sleeve remains in clamping engagement with the seal case during initial movement of said second mold member in an opening direction.

11. The mold assembly of claim 10, and further comprising a spring seat means carried by said second mold member in axial alignment with said annular flange, and a spring means located between said spring seat means and flange for biasing the clamping sleeve toward the seated seal case.

12. The mold assembly of claim 7, and further comprising a plurality of circumferentially spaced radial grooves formed in said outer annular end surface of said second mold member; said radial grooves being adapted to accommodate molding material squeezed from between the seal case and said end surface.

* * * * *